United States Patent [19]

Kinugasa

[11] Patent Number: 4,779,214

[45] Date of Patent: Oct. 18, 1988

[54] SYSTEM FOR DETECTING AN ENGINE SPEED IN A MULTI-CYLINDER INTERNAL COMBUSTION ENGINE

[75] Inventor: Yukio Kinugasa, Susono, Japan

[73] Assignee: Toyata Jidosha Kabushiki Kaisha, Toyota, Japan

[21] Appl. No.: 804,466

[22] Filed: Dec. 4, 1985

[30] Foreign Application Priority Data

Dec. 7, 1984 [JP] Japan ............................ 59-258547
Mar. 18, 1985 [JP] Japan ............................ 60-54020

[51] Int. Cl.$^4$ .................................................. G01P 3/44
[52] U.S. Cl. ...................................... 364/565; 73/116; 123/414; 123/418; 364/431.07
[58] Field of Search ............... 364/431.03, 431.07, 364/431.1, 565; 123/436, 418, 366; 73/116, 117.3, 119 A; 324/167, 168, 169

[56] References Cited

U.S. PATENT DOCUMENTS

| 4,156,411 | 5/1979 | Crall et al. ...................... 123/414 |
| 4,338,813 | 7/1982 | Hunninghaus et al. ............. 73/116 |
| 4,338,903 | 7/1982 | Bolinger ........................... 123/414 |
| 4,417,469 | 11/1983 | Stevenson et al. ................ 73/117.3 |
| 4,421,074 | 12/1983 | Garcea et al. .................... 123/90.15 |
| 4,447,880 | 5/1984 | Kasai et al. .................... 364/431.03 |

FOREIGN PATENT DOCUMENTS 55-82965 6/1980 Japan.

Primary Examiner—Parshotam S. Lall
Assistant Examiner—V. N. Trans
Attorney, Agent, or Firm—Cushman, Darby & Cushman

[57] ABSTRACT

A system for detecting engine speed in a multicylinder internal combustion engine provided with at least two sets of camshafts which are adapted for separate operation of valves connected to the sets of camshafts. The time detected is that for allowing one of the camshafts to rotate for an angle which is equal to or substantially equal to $(720/N) \times n$, where N is the number of cylinders and n is the number of sets of camshafts. The engine speed is calculated from the detected time. When the engine is in a predetermined state, such as an acceleration condition, the time is that for allowing the camshaft to rotate for an angle equal to or substantially equal to 720/N.

12 Claims, 13 Drawing Sheets

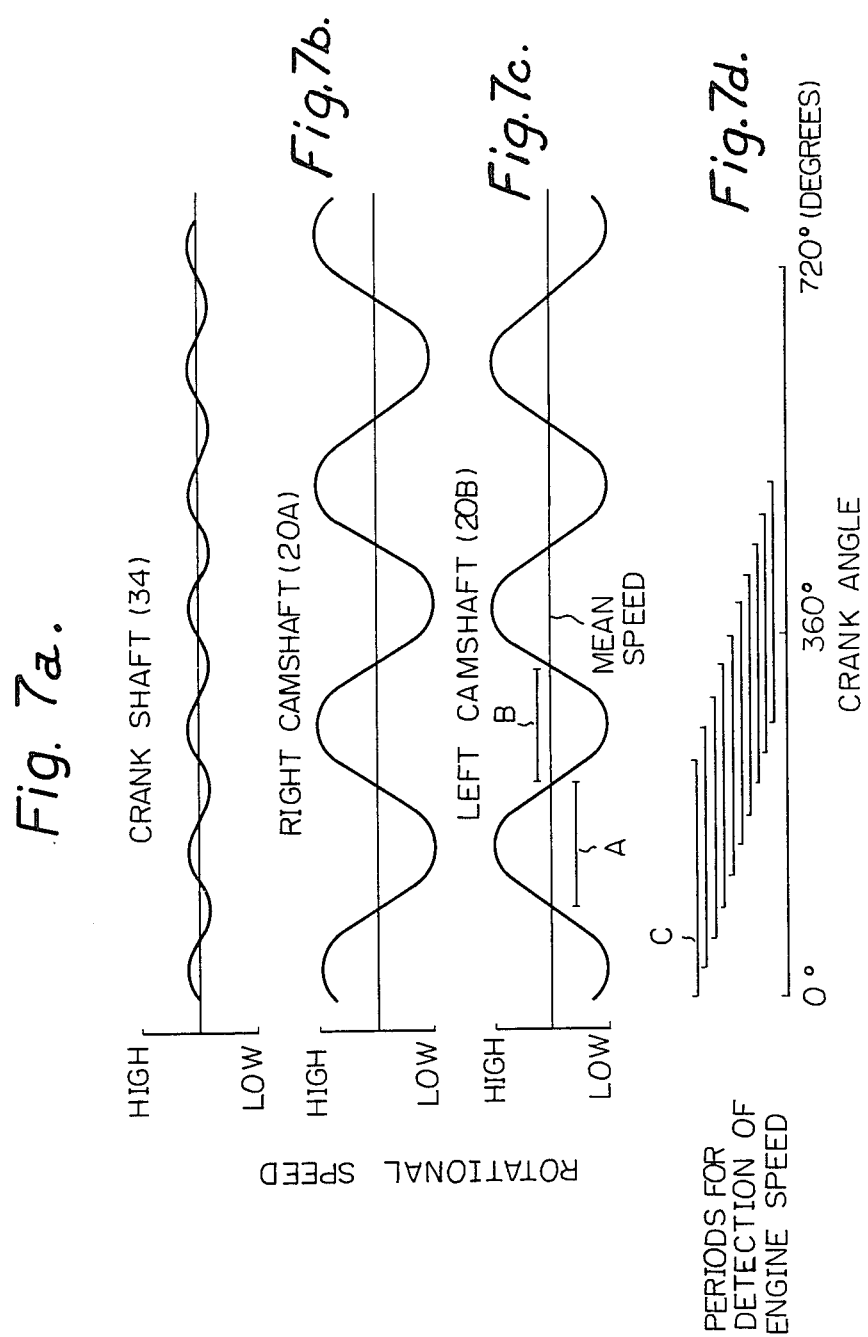

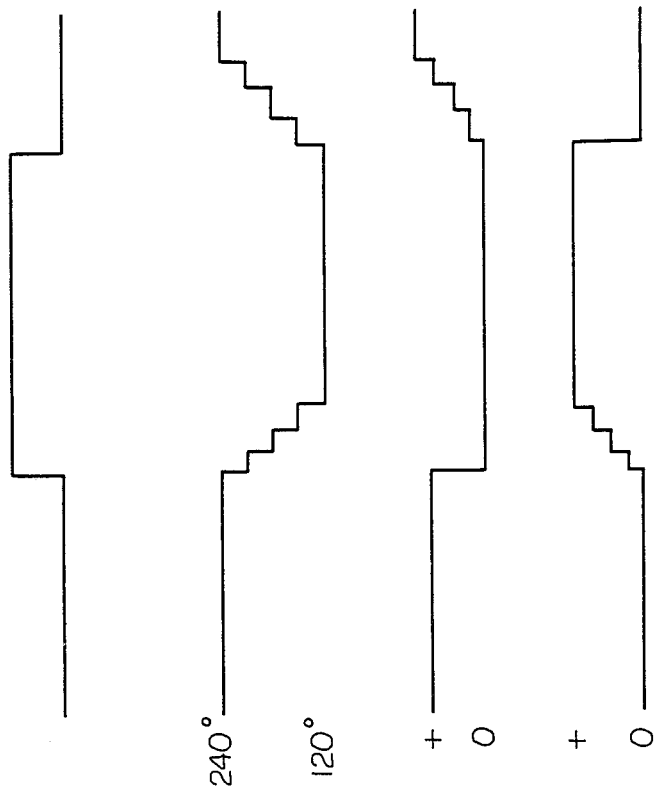

SYSTEM FOR DETECTING AN ENGINE SPEED IN A MULTI-CYLINDER INTERNAL COMBUSTION ENGINE

BACKGROUND OF THE INVENTION

1. Field of the Invention

The present invention relates to a system for detecting an engine speed in a multi-cylinder internal combustion engine. The present invention is suitably adapted for detecting an engine speed in an internal combustion engine, such as a V-type engine, a horizontally opposed cylinder engine, a W-type engine or a star-type engine, provided with a plurality of sets of camshafts for operating at least the intake valves or exhaust valves of respective cylinders, by detecting the engine speed from the rotation of the camshaft.

2. Description of the Related Art

In the prior system for detecting an engine speed in a multi-cylinder internal combustion engine, for example, shown in Japanese Unexamined Publication No. 55-82965, in order to detect accurate engine speed irrespective of the rotational speed change of the crank shaft due to the combustion, a mean engine speed is calculated from a time in which the crankshaft, rotates for a predetermined crank angle (CA). Such a predetermined crank angle is 720/4 degrees for four cylinder engine or 720/6 for a six cylinder engine, and is selected in order to prevent variation of the obtained data.

However, when using this technique in an internal combustion engine of the overhead camshaft (OHC) type with two or more rows of cylinder blocks, such as a V-type engine or a horizontally opposed cylinder engine, the engine speed must be calculated from the rotational speed of camshafts separately provided for operating intake and/or exhaust valves at each of the cylinder blocks. In these kinds of engines, therefore, a precise detection of the mean engine speed over a tme of 720/6 degrees becomes difficult, because a change of the driving force is attained at a CA cycle equal to 240 degrees (V6 type engine) which is longer than the 720/6 degrees. If the prior method used in the straight-line type engine is applied for detection of the mean speed in the V-type engine, therefore, a time would be measured for allowing one of the camshafts to rotate for a crank angle of 120 degrees. Thus the angle of change of speed of the camshaft, 240 degrees, is longer than the angle for detection of the engine speed, 120 degrees. Therefore, a precise measurement of the mean engine speed becomes impossible, so that there is a large possibility of an error in the obtained result. Thus, precise control of an engine operation, such as ignition timing control or fuel injection control by the obtained mean engine speed becomes difficult.

SUMMARY OF THE INVENTION

An object of the present invention is to provide a system for detecting accurate engine speed of an engine with plural sets of camshafts.

According to the present invention, a system is provided for detecting engine speed in a multi-cylinder internal combustion engine provided with at least two sets of camshafts, these sets of camshafts being mechanically connected to a crank shaft of the engine, and being adapted for separately operating respective valves of the respective cylinders. This system comprises: means, cooperating with one of the camshafts, for generating timing signals representing the rotational speed of the camshaft; means responsive to the signals from the timing means for detecting a time required for rotation of the camshaft for an angle at least substantially equal to $(720/N) \times n$, where N is the number of cylinders and n is the number of sets of camshafts; and means for calculating engine speed from the detected time.

BRIEF DESCRIPTION OF THE DRAWINGS

FIGS. 7(*a*)–7*d*) shows timing charts indicating the change in speed of crankshaft and camshafts, in 7(*a*), 7(*b*) and 7(*c*), respectively, and in 7(*d*) indicating periods for the detection of engine speed;

DESCRIPTION OF THE PREFERRED EMBODIMENTS

Figure 1:
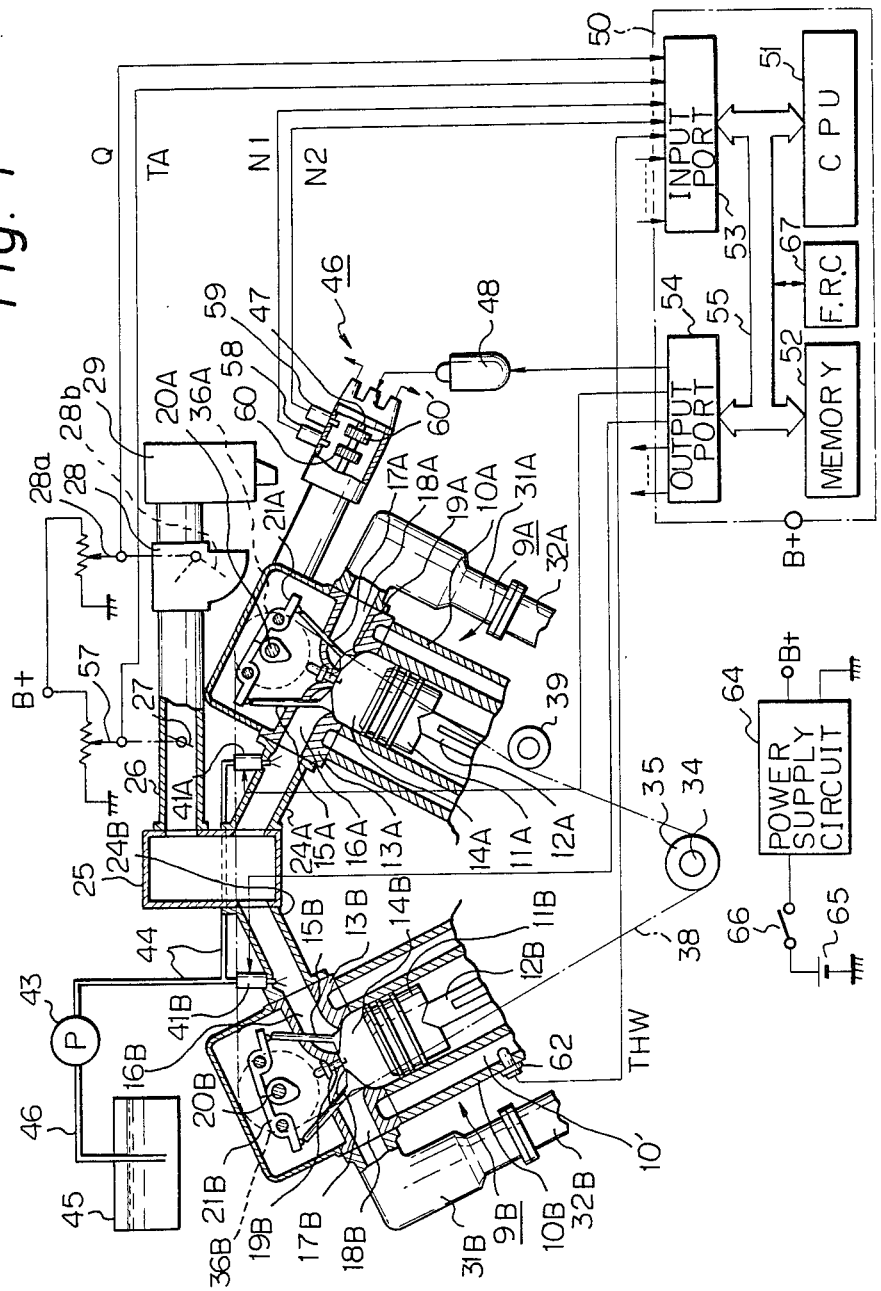
FIG. 1 is a general view of a V-type internal combustion engine provided with a system for detecting engine speed according to the present invention.

FIG. 1 shows a V-type 6 cylinder internal combustion engine to which the present invention is applied. The engine is provided with first (right) bank 9A and a second (left) bank 9B. Banks 9A and 9B are provided with three cylinders, respectively. First bank 9A has a cylinder block 10A, a piston 11A, a connecting rod 12A, a cylinder head 13A, combustion chambers 14A, intake valves 15A, intake ports 16A, exhaust valves 17A, exhaust ports 18A, and spark plugs 19A. The valves 15A and 17A are connected to a camshaft 20A via respective rocker arms 21A for operating the valves 15A and 17A by the rotation of the cam shaft 20A.

Second bank 9B has the same components as first bank 9A. Therefore parts having the same functions are designated by the same number, with the suffix B attached, and a detailed explanation thereof is omitted.

Intake ports 16A and 16B are connected to intake pipes 24A and 24B, respectively. Intake pipes 24A and 24B are commonly connected to a surge tank 25, to which a throttle body 26 is connected. A throttle valve 27, which is connected to an accelerator pedal (not shown) and is provided in throttle body 26, is arranged for controlling the amount of intake air. Located upstream of throttle valve 27 are an air flow meter 28 and an air cleaner 29.

Exhaust ports 18A and 18B are connected to exhaust manifolds 31A and 31B, respectively. Exhaust manifolds 31A and 31B are connected to exhaust pipes 32A and 32B, respectively, in order to receive the gas exhausted from the combustion in combustion chambers 14A and 14B, respectively.

The engine is provided with a crankshaft 34 which is common to both of banks 9A and 9B. Crankshaft 34 is connected to connecting rods 12A and connecting rods 12B by means of crank members (not shown). A timing pulley 35 is mounted on crankshaft 34. Pulley 35 is connected to timing pulleys 36A and 36B, mounted on camshafts 20A and 20B, respectively, by way of a timing belt 38, so that camshafts 20A and 20B attain a half rotation during one rotation of camshaft 34. A tensioner pulley 39 is mounted on an engine body in such a manner that it is urged against timing belt 38 to provide belt 38 with a required tension.

Fuel injectors 41A and 41B are mounted to intake pipes 24A and 24B, respectively. Fuel injectors 41A and 41B are connected to a fuel pump 43 by way of fuel pipes 44. Fuel pump 43 is connected to a fuel tank 45 by way of a fuel pipe 46. When fuel injectors 41A and 41B are operated, the fuel is injected to respective intake ports 16A and 16B.

Reference numeral 46 generally denotes a distributor which has a shaft 47 connected to camshaft 20A via gear members (not shown). A distributing member (not shown) is mounted on one end of shaft 47 for connecting an ignition coil with one of spark plugs 19A to be operated.

Reference numeral 50 denotes an electrical control circuit responsive to signals from various sensors for operating fuel injectors 41A and 41B, the ignition device, and other engine controlling devices. Control circuit 50 is constructed as an electric computer and is provided with a central processing unit (CPU 51), a memory 52 including a read only memory (ROM) and a random access memory (RAM), an input port 53, and an output port 54. These parts 51, 52, 53 and 54 are connected with each other by means of a bi-directional bus line 55. The various sensors are connected to the input port 50. Air flow meter 28 has a potentiometer 28a connected to a measuring plate 28b turnable in response to the flow of intake air. Potentiometer 28a is connected to input port 53 so that intake air amount signal Q is input to the inlet port 53. A throttle opening sensor 57 as a potentiometer is connected to the shaft of throttle valve 27 and is electrically connected to the input port 53, so that an electric signal TA indicative of the opening of throttle valve 27 is input to input port 53. Crank angle sensors 58 and 59 are arranged on distributor 46. Crank angle sensors 58 and 59 are constructed from Hall elements having facing magnet pieces 60 and 60' arranged on shaft 47 of distribution 46. First crank angle sensor 58 issues a pulse signal N1 at each CA interval of 30 degrees, which is input to the input port 53. This 30 degrees CA signal is, as will be described later, used to calculate the engine speed NE. Second crank angle sensor 59 issues a reference pulse signal N2 at each CA interval of 720 degrees, which corresponds to one cycle of the engine and which is input to input port 53.

An engine coolant water temperature sensor 62 is arranged on the engine body so that it is in contact with coolant water in a water jacket 10'. Temperature sensor 62 issues a signal which indicates a temperature THW of the coolant water and this signal is input to input port 53.

Output port 54 is connected to fuel injectors 41A and 41B, and signals for operating the fuel injectors are output therefrom. Output port 54 is connected to ignitor 48 including an ignition coil. Signals for operating ignitor 48 are output from output port 54, and spark plugs 19A and 19B are correspondingly operated via distributer 47.

Control circuit 50 is powered by a voltage regulator circuit 64 connected to a battery 65 via an ignition switch 66. Control circuit 50 is provided with a timing control circuit for controlling the timing operation of fuel injectors 41A and 41B and ignitor 48, including a free run counter 67 which continuously and regularly effects a count-up operation at every small interval, such as 1 μsec.

Figure 2:
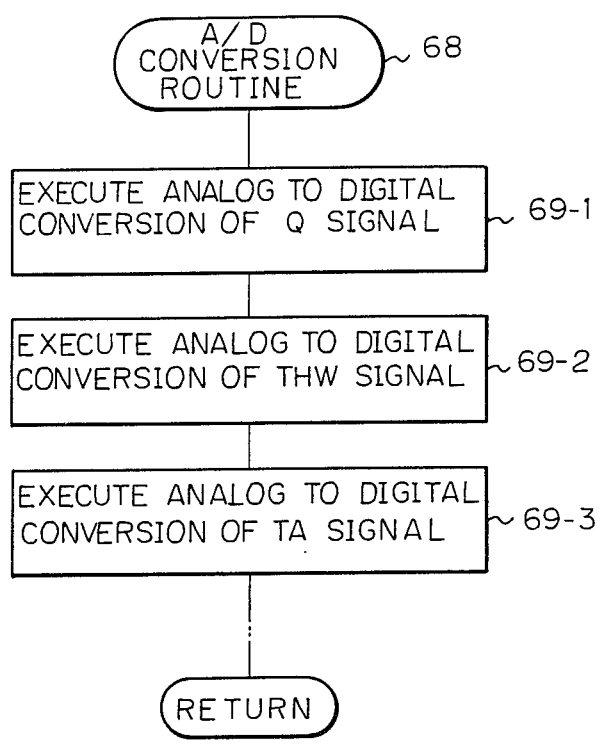
FIGS. 2 to 5 show flowcharts of routines carried out by the first embodiment of the present invention.

FIG. 2 shows a routine for analog to digital conversion of the signal from air flow meter 28, temperature sensor 62, throttle sensor 57, and other analog sensors (not shown). This is a time interruption routine carried out at a predetermined time interval. The program enters the routine at point 68. At point 69-1, the signal Q from the air flow meter 28 is converted to a digital signal; at point 69-2, the signal THW from the temperature sensor 62 is converted to a digital signal; and at point 69-3, the signal TA from the throttle sensor 57 is converted to a digital signal. These digital signals are temporarily stored in respective areas of memory 52.

Figure 3:
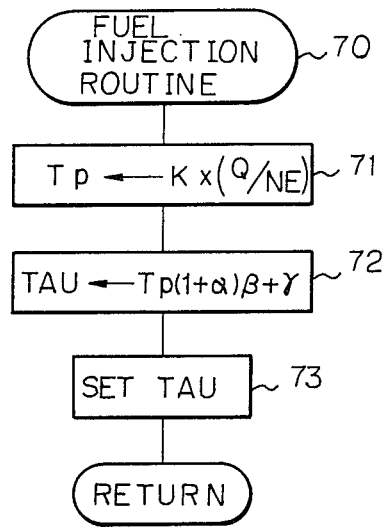

FIG. 3 is a flow chart schematically illustrating how the fuel injection control is effected. The program for attaining this routine is stored in memory 52. This routine is a crank angle interruption routine which is commenced when the crank angle of crank shaft 34 affirmed by crank angle sensors 58 and 59 reaches a predetermined crank angle prior to the crank angle at which corresponding fuel injectors 41A and 41B are to be operated. Point 70 indicates the start of this routine. At point 71, a basic fuel injection amount Tp is calculated by the following equation, from the intake air amount Q sensed by air flowmeter 28 and the engine speed NE, calculated as will be fully described later.

$$Tp = K \times (Q/NE)$$

In the above equation K is a constant. At point 72, a final fuel injection amount TAU is calculated from the following equation.

$$TAU = Tp \times (1+\alpha)\beta + \gamma$$

In the above equation, $\alpha$, $\beta$ and $\gamma$ signify correction factors determined by engine operating conditions. At point 73, a signal corresponding to the calculated fuel injection amount is issued from the output port 54 to related fuel injectors 41A and 41B, so that fuel injectors 41A and 41B are operated correspondingly to obtain the required amount of fuel.

Figure 4:
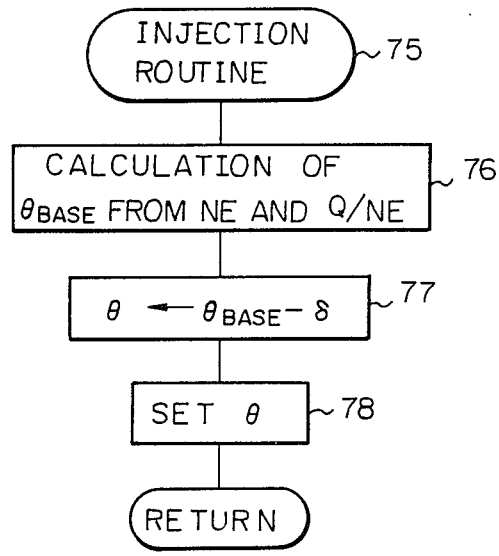

FIG. 4 schematically illustrates how the ignition timing control is effected. This routine is a crank angle interruption routine which is commenced when the crank angle detected by crank angle sensors 58 and 59 reaches a predetermined crank angle prior to the crank angle at which corresponding spark plugs 19A and 19B are to be operated. At point 76, a basic ignition timing $Q_{BASE}$ is calculated from the engine speed NE and the ratio of the amount of intake air to the engine speed Q/NE corresponding to the engine load. At point 77, a final ignition timing Q is calculated from the basic ignition timing $Q_{BASE}$ subtracted by a correction amount $\delta$, which is determined in accordance with the engine operating condition. At point 78, a signal is issued from the output port 54 to igniter 48 so that spark plugs 19A and 19B are operated at the calculated ignition timing. The value of the engine speed NE used in the above routines for controlling the fuel injection (FIG. 3) as well as ignition timing control (FIG. 4) is stored in the predetermined area of memory 52, and calculated as will be fully described later.

Figure 5:
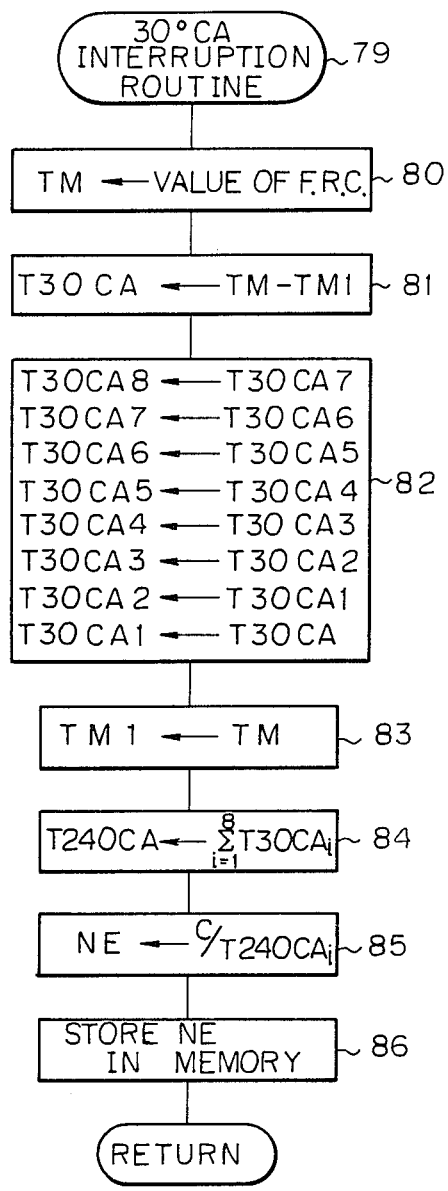
Figure 6A:
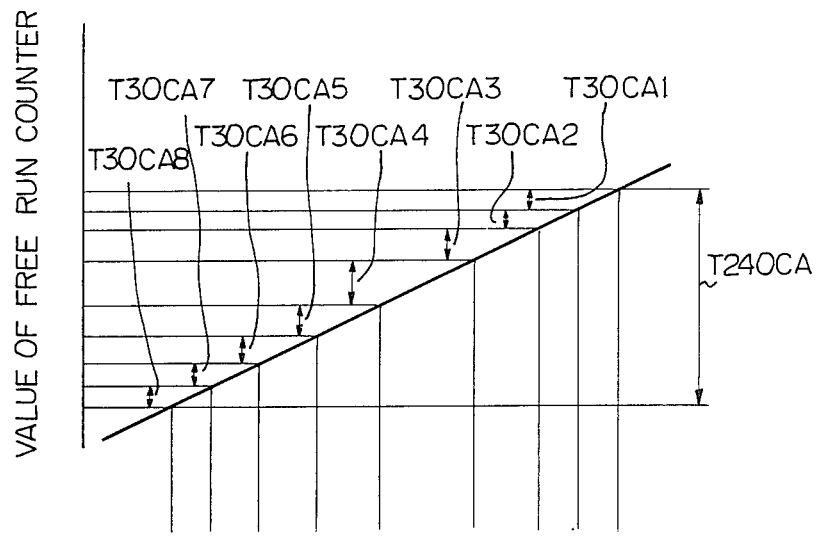
FIGS. 6(*a*)–6(*d*) shows timing charts explaining how the engine speed is calculated in the first embodiment.

FIG. 5 shows a flowchart indicating the routine for calculating the engine speed NE used in the fuel injection routine and ignition timing control routine as already outlined, as well as other engine control operations not described. This routine is a crank angle interruption routine entering into execution every time a pulse signal from first crank angle sensor 58 is generated. As shown in FIG. 6-(c), crank angle sensor 58 issue pulse signals at every crank shaft rotation of 30 degrees. In other words, the routine of FIG. 5 enters into calculation at point 79 at every crank angle rotation of 30 degrees. At point 80, a value of free run counter 67 is read out and stored in the memory area for storing the data of time TM at this point. Free run counter 67 is continuously incremented at a predetermined short period (for example, 1 $\mu$sec.) as shown in FIG. 6-(a). Thus, the value of the free run counter 67 corresponds to the time.

At point 81, a value of T30CA=TM−TM1 is calculated where TM1 is a value of TM obtained in the preceding routine. Thus, T30CA corresponds to a time for attaining a 30 degrees rotation of the crankshaft and is stored in a memory area for storing the data T30CA.

Memory 52 is provided with areas for storing the latest consecutive 8 pieces of time data for attaining the rotation of the crank shaft from T30CA1 to T30CA8. At point 82, the data of T30CA to T30CA8 is replaced by the newest data, respectively.

At point 83, the TM data is moved to the memory area for storing the time data at the preceding step, TM1. This data TM1 is used at step 81 to calculate T30A when the following interruption routine is carried out.

At point 84, a sum of T30CA1 to T30CA8 is calculated, and the resultant data T240CA is stored in a predetermined area of memory 52. T240CA is a time for allowing the crank shaft 34 to be rotated for a crank angle of 240 degrees. See FIGS. 6-(a) and 6(c).

At point 85, an engine speed NE (r.p.m.) is calculated from T240CA by the following equation.

NE=C/T240CA where C=60×(1000)²×(240/360).

In the above equation, 60 is a factor for charging units of seconds to units of minutes, 1000 is a factor for changing units of $\mu$ seconds to units of seconds.

At point 86, the data of NE is stored in a predetermined area of memory 52. This data is used to calculate the fuel injection amount and ignition timing as already explained in FIGS. 3 and 4, or other engine parameters not explained.

Figure 6B:
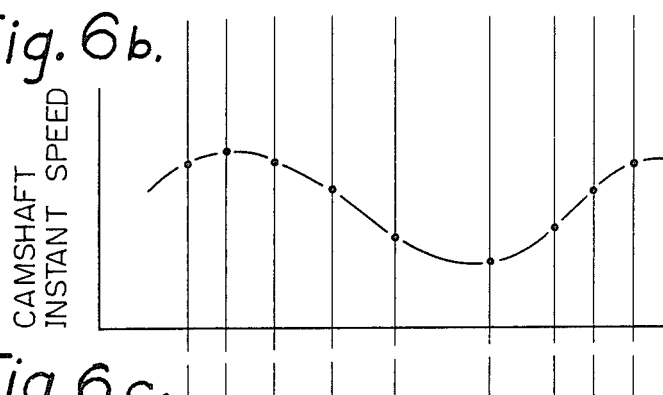
Figure 6C:
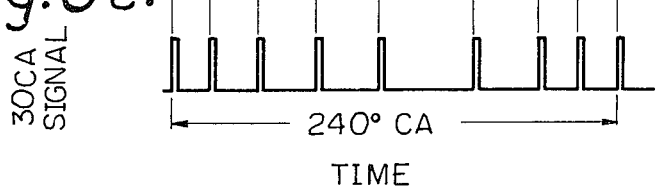

As shown in FIG. 6(b), the camshaft speed changes cyclically. The engine speed NE as calculated is, therefore, a mean speed during a period for allowing the camshaft to be rotated for an angle of 240 degrees.

An advantage of the system for detecting engine speed as effected by the routine of FIG. 5 according to this invention will be explained. In a V-type engine, the speed of the crankshaft 34 changes cyclically as shown by FIG. 7(a), while the rotational speeds of the camshafts 20A and 20B change cyclically as shown in FIGS. 7(b) and 7(c). respectively. One cycle of the change in the rotational speed of the camshafts 20A and 20B is longer than one cycle of the change in the rotational speed of crankshaft 34, as shown in FIG. 7(a). In the prior art methods for detecting a mean engine speed in a period of crank angle range of 720/N degrees, that is, 120 degrees for a six cylinder engine, is calculated as the rotational speed of the crankshaft changes at this one cycle. This is because the frequencies of the change of speed of the camshafts and the crankshaft are the same and equal to 120°. However, in the V-type engine, one cycle of change in the rotational speed of the camshafts is longer than one cycle of change in the rotational speed of the crankshaft, i.e., twice as long as the cycle of the change in the rotational speed of the crankshaft as shown in FIGS. 7(a), 7(b) and 7(c). Thus the crank angle range of 720/N, i.e., 120 degrees, is insufficient to obtain a precise engine speed. For example, if the engine speed is calculated from period A in FIG. 7(c), the obtained result is larger than the actual mean speed. Conversely, if the engine speed is calculated at a period as shown by B, the obtained result would become too small with respect to the actual mean engine speed. According to the present invention, the engine speed is calculated from T240, which is the data in a crank angle area C in FIG. 7(d). Since the change of the rotational speed of the camshafts of a V-type engine connected to crank angle sensors 58 and 59 occurs at a cycle of 240 degrees, i.e., (720/N)×n degrees, rather than 120 degrees, i.e., 720/N degrees, as is the case in a normal in-line engine, the present invention allows a precise engine mean speed to be obtained irrespective of a change of the instant speed of the camshafts. Note, N denotes the number of cylinders, and n denotes the number of camshafts.

Figure 8:
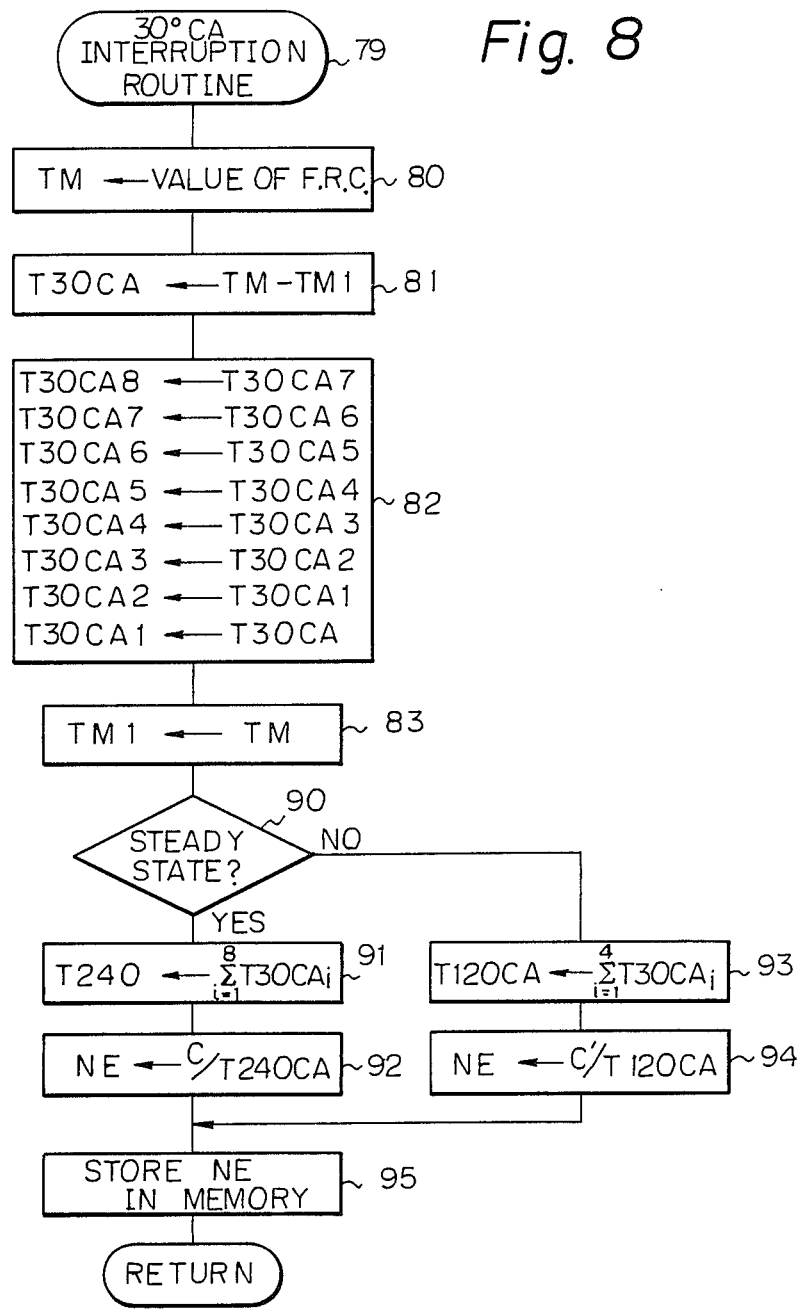
FIG. 8 shows a routine for calculating engine speed in the second embodiment.

FIG. 8 shows a routine for calculating the engine speed NE in accordance with the second embodiment of the present invention. This routine includes a point 90 at which it is determined whether or not the engine is in the steady state. When the engine is in the steady state, the program goes to points 91 and 92, which are the same as the steps 84 and 85 in FIG. 5, and at which the engine speed NE is calculated from T240CA which is a time for allowing the camshaft to rotate for an angle of 240 degrees.

When the engine is in a condition other than the steady state, the program goes to point 93 where T120CA is calculated, which is a time for allowing the camshaft to rotate for an angle of 120 degrees. At point 94, the engine speed NE is calculated from T120CA by using the equation

NE=C'/T120CA where C'=60×(1000)×(120/360).

In this embodiment, the engine speed during the transient state is calculated from T120CA rather than T240CA. Thus, a period for calculating the engine speed is suitably shortened. Therefore, detection of the engine speed during the transient state is realized without delay, even if the engine speed rapidly changes as a result of acceleration or deceleration.

Figure 9:
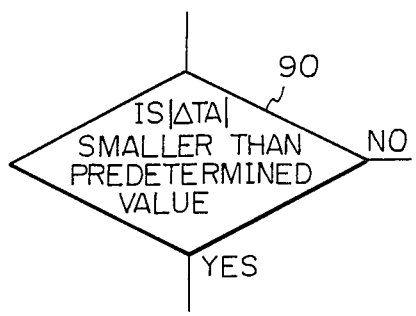
FIGS. 9 to 12 indicate various ways for the detection of an engine transient state in step 90 in FIG. 8.

The judgement of the steady state at point 90 can be effected as shown in FIG. 9, by judging whether the absolute value of rate of change of the throttle opening $\Delta$TA is smaller than a predetermined value. If the result of the discrimination is "yes", it is judged that the engine is in the steady state. When the result of discrimination is "no", it is judged that the engine is in the transient state, so that the period for determining the engine speed is decreased to T120CA. This embodiment allows the judgement to be effected very quickly because the judgement of whether the engine is in the steady state or transient state is made on the basis of the throttle opening which initially indicates the change of the engine condition. In place of the rate of change of the throttle opening, ΔTA, the rate of change in ΔTA, ΔΔTA may be used.

Figure 10:
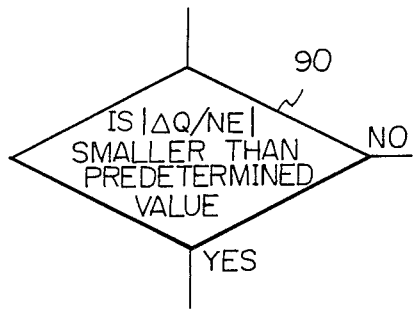

In the embodiment shown in FIG. 10, the judgement at point 90 in FIG. 8 is effected by judging whether the absolute value of the rate of change of the ratio of the amount of intake air to engine speed Δ(Q/NE) is small than a predetermined value. When the result of the discrimination is "yes", it is judged that the engine is in the steady state. When the result of the discrimination is "no", then it is considered that the engine is in the transient state. This embodiment allows the engine condition to be precisely detected since Q/NE precisely correspond to the engine load.

Figure 11:
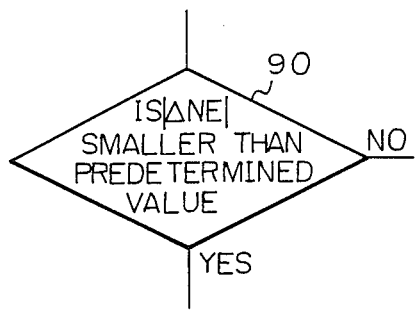

In the embodiment as shown in FIG. 11, the judgement at point 90 of FIG. 8 is effected by detecting whether the absolute value of the rate of change in the engine speed ΔNE is smaller than a predetermined value. If the result of the judgement is "yes", this means that the engine is in the steady state. If the result is "no", this means that the engine is in the transient state. This embodiment is disadvantageous in that there is a delay due to the inevitable time lag that occurs when calculating the engine speed. However, this delay sometimes may be advantageous when used with a particular type of engine.

Figure 12:
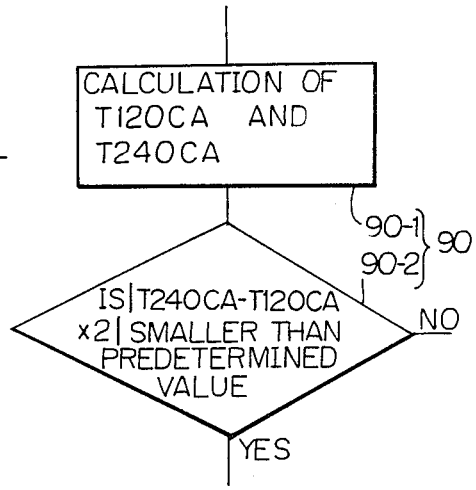

In the embodiment as shown in FIG. 12, the judgement at point 90 in FIG. 8 is effected by calculating the difference T240CA and twice T120CA at point 90-1 and judging whether the absolute value of the difference is smaller than a predetermined value at point 90-2. If the result of the judgement is "yes", it is considered that the engine is in the steady state. If the result is "no", this means that the engine is in the transient state.

Means for detecting whether the engine is in the steady state or the transient state other than described in FIGS. 9 to 12 may be employed. Furthermore, it is possible to change the threshold level in accordance with the sign.

Figure 13:
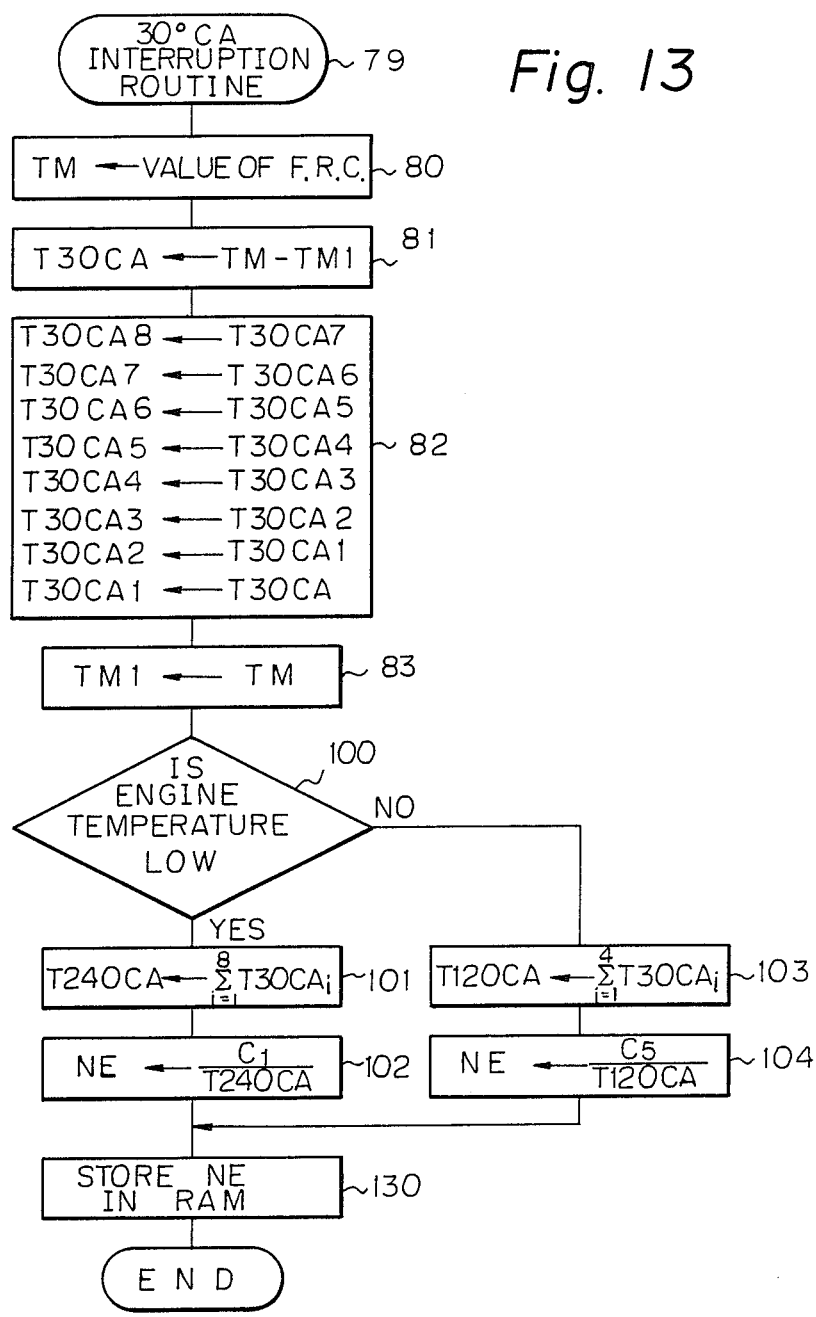
FIG. 13 shows a routine for calculating engine speed in the third embodiment.

FIG. 13 shows another embodiment featuring a step 100, where it is judged whether the engine temperature detected by the engine coolant temperature sensor 62 is smaller than a predetermined value. When the engine is cold, the program proceeds to points 101 and 102, which are the same as points 91 and 92 in FIG. 8, respectively, to allow the engine speed NE to calculated from T240CA. When the engine is already warmed-up, the program proceeds to points 103 and 104, which are the same as the points 93 and 94 in FIG. 8, to permit the engine speed to be calculated from T120CA.

In this embodiment, the engine speed is calculated from T240CA when the engine is cold. Therefore, any change in engine speed to be detected, which otherwise occurs during the engine low temperature condition due to a decrease in the tension of the timing belt 38 if the engine speed NE is calculated from T120CA, is prevented.

Figure 14:
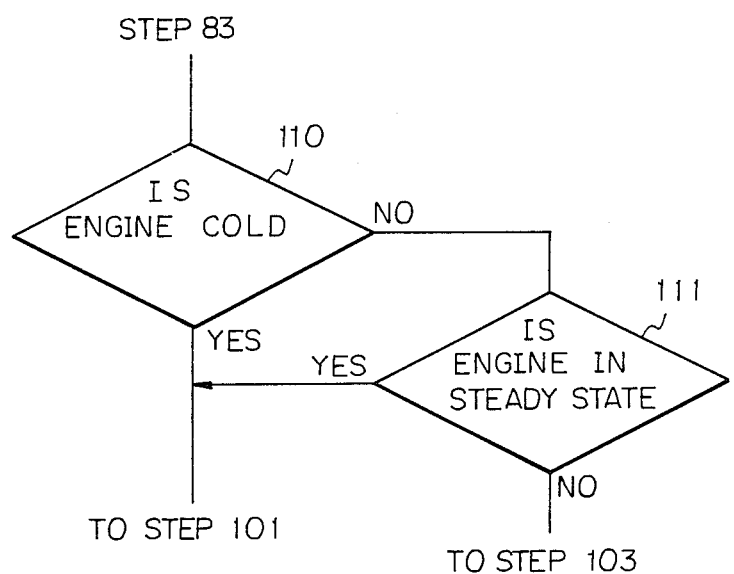
FIG. 14 shows a flowchart in part for calculating engine speed in the fourth embodiment.

FIG. 14 shows an embodiment which is a modification of FIG. 13 combined with FIG. 8. This embodiment includes a point 110 for judging whether the engine has warmed-up and a point 111 for judging whether the engine is in the steady state. When the engine is cold and or when the engine is in the steady state, the points corresponding to points 101 and 102 in FIG. 13 are executed to permit the engine speed NE to be calculated from T240CA. When the engine is warmed-up and the engine is in a transient state, the points corresponding to points 103 and 104 are executed to permit the engine speed NE to be calculated from T120CA.

Figure 15A:
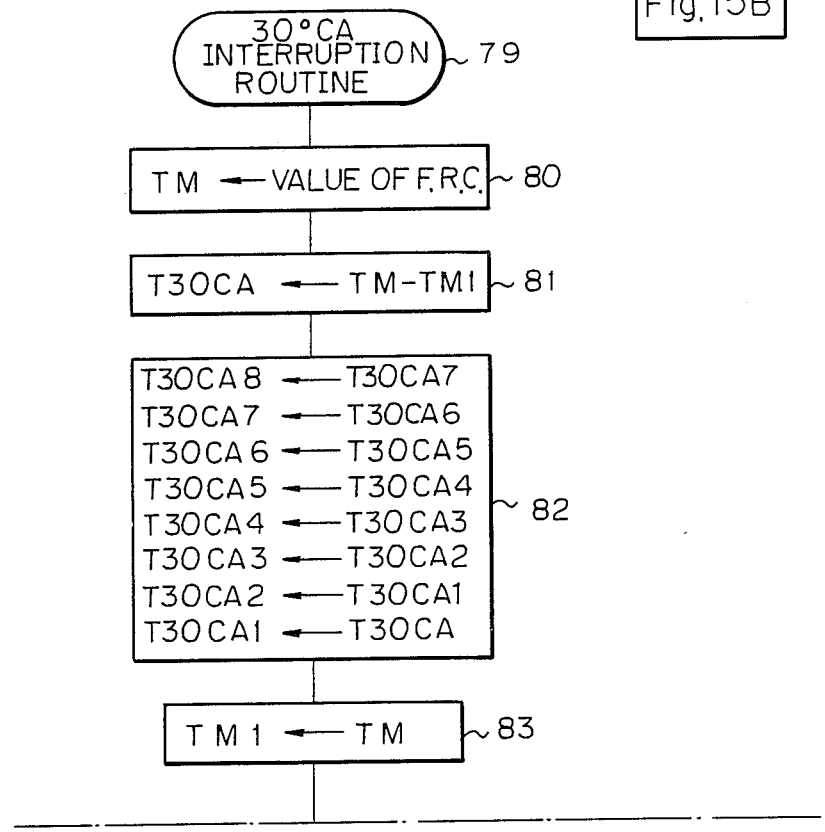
FIG. 15 shows a flowchart for calculating engine speed in the fifth embodiment; and, FIGS. 16(*a*)–16(*d*) shows a timing chart indicating how the period for detecting engine speed is gradually changed in the embodiment of FIG. 15.
Figure 15B:
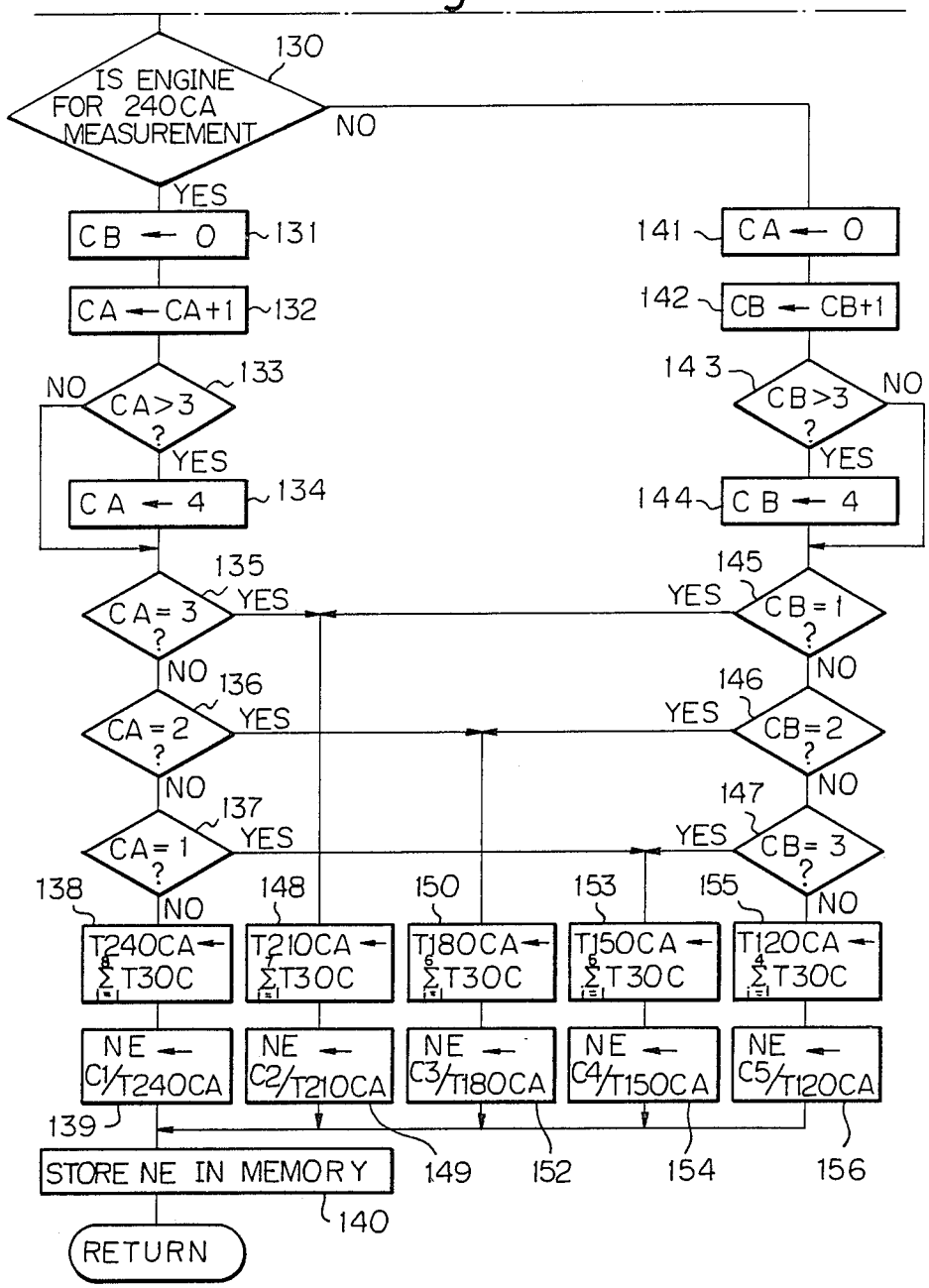

FIG. 15 shows an embodiment wherein the period for measuring the engine speed is gradually varied when the engine is switched between a condition where the engine speed is calculated from the time for allowing the camshaft to rotate by an angle of 240 degrees, T240CA and condition where the engine speed is to be calculated from the time for allowing the camshaft to rotate by an angle of 120 degrees T120CA. This embodiment allows a gradual change in the period for calculating the engine speed. Theefore, it is possible to maintain a good driveability together with a low exhaust emission.

At point 130 it is judged whether the engine is in the condition where the engine speed NE is to be calculated from T240CA. The judgement at this point 130 is effected in a similar manner as for points 90 and 100, or 110 and 111 in FIGS. 8, 13 or 14. When the result of the discrimination at point 130 is "yes", and when the engine is in the steady state, the program goes, via points 131–137 as will described later, to points 138 and 139 where the engine speed NE is calculated from T240CA.

When the engine is changed from a condition where the engine speed is to be calculated from T240CA to a condition where the engine speed is to be calculated from T120CA, the result of the judgement at point 130 becomes "no". The program then proceeds to point 141 where a counter CA is reset. At point 142 a counter CB is incremented. The counter CB counts the number of this routine as executed after the engine condition is changed from a condition where the engine speed is to be calculated from T240CA to a condition where the engine speed is to be calculated from T120CA. The counter CB is used when the engine condition is changed to an opposite condition, as will described later.

At point 143 it is judged whether the value of the counter CB is larger than 3. When the value of CB is larger than 3, the program proceeds to point 144 where 4 is moved to CB.

At point 145 it is judged whether the counter CB is 1. At point 146 it is judged whether the value of the counter CB is 2. Then, at point 147, it is judged whether the value of the counter CB is 3. When this routine is the first routine after the engine is changed from a condition where the engine speed is to be calculated from 240CA to a condition where the engine speed is to be calculated from T120CA, the result of the judgement at point 147 is "yes". Then the program proceeds from point 145 to point 148, where the time T210CA is calculated for allowing the camshaft to be rotated for the last 210 degrees. At point 139, the engine speed NE is calculated by C2/T210CA, where C2 is calculated by $$C2 = 60 \times (1000)^2 \times (210/360).$$

At point 149 the engine speed NE is calculated from C2/T210A.

When this routine is the second routine after the engine condition is changed, the result of the discrimination at point 145 is "no" and the result of discrimination at the step 146 is "yes". Thus the program goes to point 150, at which a time for permitting the camshaft to rotate the last 180 degrees T180CA is calculated. At point 152 the engine speed NE is calculated by C3/T180CA, where $$C3 = 60 \times (1000)^2 \times (180/360).$$

When this routine is the third routine after the engine condition has changed, the result of the discrimination at point 147 is "yes". Thus, the program goes to point 153, at which the time for permitting the camshaft to rotate for an angle of 150 degrees T150CA is calculated. At point 154, the engine speed NE is calculated from C4/T150CA, where $$C4 = 60 \times (1000)^2 \times (150/360).$$

When 4 or more routines are effected, the result of the judgement at point 147 is "yes". Thus, the program goes to point 155, at which the period for allowing the camshaft to rotate for an angle 120 degrees T120CA is calculated. At point 156, the engine speed NE is calculated from C5/T120CA, where $$C5 = 60 \times (1000)^2 \times (120/360).$$

Points 155 and 156 are the same as points 103 and 104 in FIG. 13. As can be easily understood, the crank angle range for calculating the engine speed is gradually changed from T240CA to T120CA when the engine condition is changed. See FIGS. 16(*b*) and (*d*).

When the engine condition is changed from that at which the engine speed NE is to be calculated from the time for allowing the camshaft to rotate for an angle of 120 degrees T120CA to that at which the engine speed NE is to be calculated from the time for allowing the camshaft to rotate for an angle of 240 degrees, the result of the judgement at point 130 becomes "yes". Thus the program proceeds to point 131, at which the value of the counter CB becomes zero. At point 132, the value of the counter CA is incremented. At point 133 it is judged whether the value of the counter CA is larger than 3. If the result is "yes", the counter CA is fixed to 4 at point 134.

At point 135, it is judged whether CA=3; at point 136 it is judged whether CA is 2; and, at point 137, it is judged whether CA is 1. When the first routine is effected after the engine is changed from a condition at which the engine speed NE is to be calculated from T120CA to a condition at which the engine speed NE is to be calculated from T240CA, the result of the discrimination at points 135 and 136 is "no", and the result of the discrimination at point 137 is "yes". Thus, the program goes to points 153 and 154 for calculating the engine speed NE from T150CA.

When the second routine is effected after the engine condition is changed, the result of the discrimination at point 135 is "no", and the result of the discrimination at point 136 is "yes". Thus, the program goes to point 150, at which the engine speed NE is calculated from T180CA.

When the third routine is effected after the engine condition has changed, the result of the discrimination at point 135 is "yes". Thus, the program goes to points 148 and 149 for calculating the engine speed NE from T210CA.

When the fourth or more routine is effected after the engine condition has changed, the results of the discrimination at points 135, 136, and 137 are all "no". Thus, the program goes to points 138 and 139 for calculating the engine speed NE from T240CA.

As will be clearly understood, the period for calculating the engine speed is gradually extended when the engine is changed from a condition at which the engine speed is to be calculated from T120CA to a condition at which the engine speed is to be calculated from T240CA. See FIGS. 16(*b*) and 16(*c*).

This embodiment allows a gradual change in the period for detecting the mean speed at each angle of 30 degrees, so that an abrupt change in engine speed is prevented when the engine condition changes between the state at which the engine speed is to be calculated from T120CA and that at which the engine speed is to be calculated from T120CA. As a result, the switching is carried out without generating shock and, thus, driveability is improved. Furthermore, the fuel injection amount and the ignition timing are properly controlled so that toxic emissions in the exhaust gas are decreased.

The CA 30 degrees gradual change in the period for detecting the engine speed allows the construction of the system to be simplified. Also, instead of the gradual change in the period for detecting the engine speed, this period can be continuously changed. Furthermore, the CA for changing the period for detecting the engine speed need not be fixed at 30 degrees. For example, the CA may be increased so that it becomes larger than 30 degrees when the engine is under a rapid acceleration condition, so that a change in engine speed can be detected without delay.

Throughout the above embodiments, according to the present invention, an engine speed can be detected without variation, so that the fuel injection control, ignition timing control, and engine operation control can be properly carried out, decreasing the emission of toxic components in the exhaust gas, increasing the fuel consumption efficiency, preventing variations in the engine torque, and preventing the generation of vehicle surge or engine knocking. Since the ignition timing can be precisely controlled, the value of the ignition timing can be as far advanced as possible without generating knocking in the engine, and thus the engine output power can be increased.

It should be noted that, in the prior art, where the engine speed is calculated from the time for allowing the crankshaft to be rotated for an angle of 720/N (120 degrees for a 4 cylinder engine), the tension of the timing belt can be made very high, so that the camshafts are rigidly connected to each other. In this case, one change cycle of the speed of the camshafts can be equalized to one change cycle of the speed of the crankshaft, which is equal to 120 degrees for a 4 cylinder engine. However, this solution shortens the service life of the timing belt, and increases friction in the engine. According to the present invention, detection of the engine speed can be correctly effected even if the change cycle of the speed of the camshafts and the change cycle of the speed of the crankshaft are maintained at different cycles. Thus, the timing belt tension can be lowered, prolonging the service life of the belt and decreasing friction in the engine.

It should be also noted that, in the prior art, it is possible to arrange the first crank angle sensor 58 on the crankshaft so that engine speed can be precisely detected. However, this solution complicates the construction of the system. According to the system of the present invention, the construction can be simplified since both of the crank angle sensors 58 and 59 can be arranged on the same camshaft.

The present invention is described with reference to embodiments realized in a 6 cylinder V-type SOHC engine. However, the present invention is not limited to this special type of engine. For example, the present invention can be applied to an engine in which combustion is carried out at different spacings, a horizontally opposed cylinder engine, a W-type engine, a star-type engine, and a DOHC engine.

I claim:

1. A system for detecting engine speed in a multi-cylinder internal combustion engine which has N cylinders provided with n sets of camshafts where n is at least two, each of said sets of camshafts being mechanically connected to a crank shaft of said engine, each of said sets of camshafts for separately operating respective valves of respective cylinders in said enginer, said system comprising:
   timing means, cooperating with one of said camshafts, for issuing timing signals representing a rotational speed of said one camshaft;
   angle determining means for determining a determined angle substantially equal to $(720/N) \times n$ degrees;
   engine state detecting means for detecting whether the engine is in a state in which said engine requires a shortened period for detection of said engine speed;
   modifying means for modifying a time of calculating said engine speed when said engine is in said state, by changing said determined angle;
   time detecting means, responsive to said timing signals from said timing means, for detecting a time required for a rotation of said camshaft by said determined angle and
   means for calculating an engine speed from said detected time.

2. A system according to claim 1, wherein said engine state detecting means includes means for detecting whether the engine is in a transient state, and said modifying means comprises means for shortening a time for detection of said engine speed when said engine is in said transient state.

3. A system according to claim 2, wherein said transient state detecting means comprises means for detecting a state at which a change of opening of a throttle valve is larger than a predetermined value.

4. A system according to claim 2, wherein said detecting means comprises means for detecting a state of which a change in an intake air amount corresponding to an engine speed is larger than a predetermined value.

5. A system according to claim 2, wherein said detecting means comprises means for detecting a state at which a change in said engine speed is larger than a predetermined value.

6. A system according to claim 2, wherein said transient state detecting means comprises means for detecting a state at which a difference between said time for allowing said camshaft to rotate for an angle of $(720/N) \times n$ and n times said time for allowing the camshaft to rotate for an angle of $720/n$ is larger than a predetermined value.

7. A system according to claim 1, wherein said engine state detecting means includes means for detecting whether said engine is warmed-up, and said modifying means includes means for shortening said time for detection of said engine speed when said engine is warmed-up.

8. A system according to claim 1, wherein said engine state detecting means comprises first means for detecting whether said engine is warmed-up, second means for detecting whether said engine is in a transient state, and said modifying means includes third means for shortening said time for detection of said engine speed when said engine is warmed-up and said engine is in said transient state.

9. A system according to claim 1, further comprising means for detecting a change of said engine condition between a state at which an engine speed is calculated by said longer crank angle and a state at which an engine speed is calculated by said shorter crank angle, and means for gradually changing said crank angle between said short crank angle and said long crank angle.

10. A system for detecting engine speed in a multicylinder V-type internal combustion engine which has N cylinders provided with n sets of camshafts where n is at least two, each of said sets of camshafts being mechanically connected to a crank shaft of said engine, each of said sets of camshafts for separately operating respective valves of respective cylinders in said engine, said system comprising:
   timing means, cooperating with one of said camshafts, for issuing timing signals representing a rotational speed of said one camshaft;
   time detecting means, responsive to said timing signals from said timing means, for detecting a time required for a rotation of said camshaft by an angle at least substantially equal to $(720/N) \times n$ degrees; and
   means for calculating an engine speed from said detected time.

11. A system for detecting engine speed in a multicylinder internal combustion engine which has N cylinders provided with n sets of camshafts where n is at least two, each of said sets of camshafts being mechanically connected to a crank shaft of said engine, each of said sets of camshafts for separately operating respective valves of respective cylinders in said engine, said system comprising:
   timing means, cooperating with one of said camshafts, for issuing timing signals representing a rotational speed of said camshaft;
   memory means for storing a plurality of time data;
   running time counter means for maintaining a running time count based on said timing signals;
   computing means for:
   (a) determining a crankshaft rotation per cylinder amount as $720/N$, an angle of change of speed of said crankshaft in cycles of which a speed of said crankshaft oscillates, and a determining angle which, multiplied by a first integer, equals said $720/N$, and which multiplied by a second integer equals said change of speed angle;
   (b) sampling said running time counter means at intervals of said determining angle;
   (c) updating said plurality of time data in said memory means at intervals of said determining angle, using said sampled value of said running time counter and previous time data in said memory means; and
   (d) calculating a time data for a predetermined angle by summing a number of most recent ones of said time data in said memory means.

12. A method for detecting engine speed in a multi-cylinder internal combustion engine that has N cylinders and n sets of camshafts where n is at least two, and where each of said sets of camshafts are mechanically connected to a crankshaft of said engine to separately operate respective valves of respective cylinders in said engine, comprising the steps of:

maintaining a running time count of a rotational speed of said camshaft;

determining a camshaft rotation per cylinder amount as 720/N;

determining an angle of change of speed of said crankshaft in cycles of which angle a speed of said crankshaft oscillates;

determining a determining angle which times a first integer equals said 720/N, and which times a second integer equals said change of speed angle;

obtaining a sample of said running time at intervals of said determining angle;

storing a plurality of time data in a memory means;

updating said plurality of time data at intervals of said determining angle, using said sampled value of said running time; and calculating the time data for a predetermined angle by summing a number of most recent ones of said time data in said memory means.

* * * * *